H. L. LEONARD.
Fishing-Rod.
No. 169,181. Patented Oct. 26, 1875.
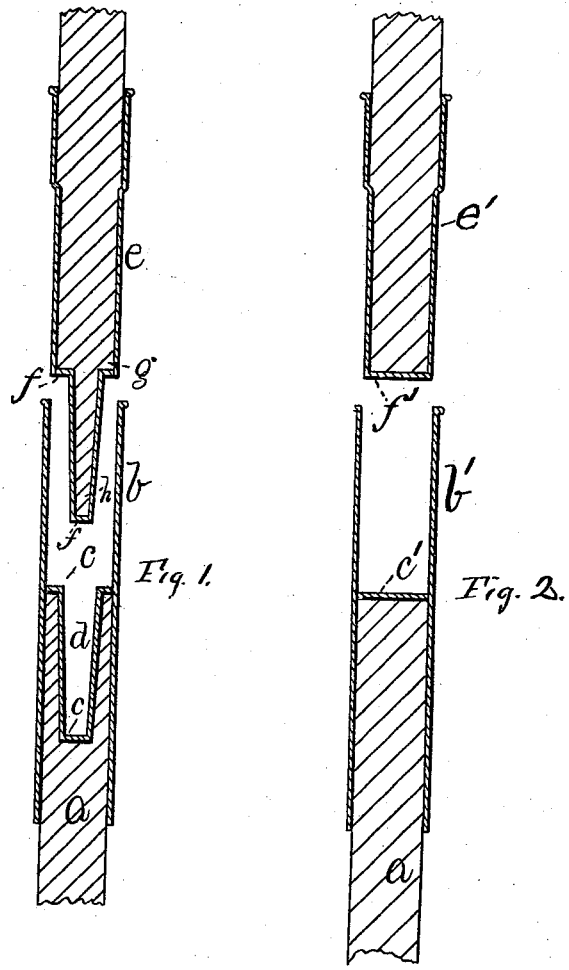

UNITED STATES PATENT OFFICE.

HIRAM L. LEONARD, OF BANGOR, MAINE.

IMPROVEMENT IN FISHING-RODS.

Specification forming part of Letters Patent No. 169,181, dated October 26, 1875; application filed August 30, 1875.

*To all whom it may concern:*

Be it known that I, HIRAM L. LEONARD, of Bangor, in the county of Penobscot and State of Maine, have invented certain new and useful Improvements in Ferrules for Fishing-Rods; and I do hereby declare that the following is a full, clear, and exact description thereof, that will enable others skilled in the art to which it appertains to make and use the same, reference being had to the accompanying drawings forming a part of this specification, in which—

Figure 1 shows a section of my invention; Fig. 2, a modification of same.

Same letters show like parts.

My invention relates to the ferrules used to connect the parts of jointed fishing-rods, and is intended to prevent the access of water to the wooden portion of the rod. It is particularly applicable to rods made from segments of bamboo, united by glue, and known as "split-bamboo" rods. The outer surface of these rods is protected and rendered waterproof by varnish; but the ends, as heretofore constructed, have been unprotected. From the nature of their construction they are peculiarly liable to damage from moisture, which attacks and softens the glue which unites the parts, and eventually ruins the rod.

Reference to the accompanying drawing will assist in explaining my device. At $a$ is shown one portion of a rod—for instance, the butt, having thereon the socket-ferrule $b$ of the joint. This ferrule $b$, as constructed in my improved joint, may be termed an imperforate socket-ferrule, being so made that no water can penetrate through it to the wood of the rod. When the joint is made with a dowel and dowel-pin the ferrule $b$ is provided with an imperforate socket, $d$, shaped to correspond to and receive the dowel-pin, and so fitted within the ferrule $b$ as to prevent any access of water through or between the parts. Another form of construction is used when the joint is made without the dowel and pin, and this modification is shown in Fig. 2, the imperforate socket-ferrule being shown at $b'$, and being provided with a stop, $c'$, covering the end of the wooden portion of the rod. The next piece of the rod is also provided with an imperforate cap-ferrule, $e$, covering the end of the rod, and inclosing it and the dowel-pin in an impervious casing. The shoulders, formed by the dowel-pin and end of the rod, are stopped by an annular ring, $f$, so that no water can penetrate, and the end of the dowel-pin itself is covered by a cap, $p$. In the modification, Fig. 2, where no dowel-pin is used the end of the rod-joint is covered and made water-tight by a cap, $f'$, covering it, making its ferrule $e'$ an impervious cap-ferrule.

For the purposes of illustration I have described the ferrules forming the first joint of the rod, but, as will be readily seen, my invention will apply equally to all the joints.

What I claim as my invention, and desire to secure by Letters Patent, is—

A joint for bamboo or other fishing-rods, consisting essentially of an imperforate cap-ferrule, in combination with a correspondingly-shaped and imperforate socket-ferrule, substantially as and for the purposes set forth.

In testimony that I claim the foregoing, I have hereunto set my hand this 27th day of August, 1875.

HIRAM L. LEONARD.

Witnesses:
J. P. BASS,
WM. FRANKLIN SEAVEY.